US006389110B1

United States Patent
Fischer et al.

(10) Patent No.: US 6,389,110 B1
(45) Date of Patent: *May 14, 2002

(54) TELECOM SERVICE IDENTIFICATION RESONATOR APPARATUS AND TECHNIQUE

(75) Inventors: Jonathan H. Fischer, Blandon; Donald R. Laturell, Allentown; Lane A. Smith, Easton, all of PA (US)

(73) Assignee: Agere Systems Guardian Corp., Orlando, FL (US)

(*) Notice: Subject to any disclaimer, the term of this patent is extended or adjusted under 35 U.S.C. 154(b) by 48 days.

This patent is subject to a terminal disclaimer.

(21) Appl. No.: 09/592,864

(22) Filed: Jun. 13, 2000

Related U.S. Application Data (60) Provisional application No. 60/177,685, filed on Jan. 24, 2000.

(51) Int. Cl.$^7$ .......................... H04M 1/24; H04M 3/08; H04M 3/22
(52) U.S. Cl. ...................... 379/1.04; 379/22.02; 379/30; 324/520
(58) Field of Search ................................. 379/1, 22, 24, 379/27, 29, 399, 1.01, 1.03, 1.04, 3, 12, 22.02, 27.03, 28, 30; 324/500, 520, 523, 525, 526, 527; 340/825.36, 825.79; 455/450, 426, 454, 507

(56) References Cited

U.S. PATENT DOCUMENTS

| | | | | |
|---|---|---|---|---|
| 4,209,666 A | * | 6/1980 | Lawton ........................ | 370/13 |
| 4,456,793 A | * | 6/1984 | Baker et al. .................. | 179/99 |
| 4,528,427 A | * | 7/1985 | Gadonna et al. ......... | 179/175.3 |
| 5,166,676 A | * | 11/1992 | Milheiser ................ | 340/825.54 |
| 5,305,008 A | * | 4/1994 | Turner et al. ................. | 342/44 |
| 5,357,556 A | * | 10/1994 | Dresser ....................... | 379/27 |
| 5,541,604 A | * | 7/1996 | Meier .......................... | 342/42 |
| 5,722,076 A | * | 2/1998 | Sakabe et al. .............. | 455/450 |
| 6,133,834 A | * | 10/2000 | Eberth et al. ............ | 340/572.5 |
| 6,172,608 B1 | * | 1/2001 | Cole ........................ | 340/572.1 |
| 6,215,855 B1 | * | 4/2001 | Schneider .................... | 379/22 |
| 6,292,541 B1 | * | 9/2001 | Tice et al. ............... | 379/22.03 |

* cited by examiner

Primary Examiner—Binh Tieu
(74) Attorney, Agent, or Firm—William H. Bollman (57) ABSTRACT

Telephone line service type identification is provided to a telephone technician in the field by the placement of one or more tuned circuit(s) across the telephone line. In one embodiment, an inexpensive tuned circuit such as a ceramic resonator forms a telecom service resonator ID device which is placed across a telephone line, either at the central office or at the customer premises. Injection of a test current at a predetermined frequency, and a suitable amplitude of the same indicates to the technician aspects of telecom service to that particular telephone line (e.g., the existence of POTS, ISDN, and/or xDSL) and or use of the telephone line by a home network such as HPNA. In another embodiment, a telecom service transponder ID device is formed to provide line service identification to an interrogating line technician. The telecom service transponder ID device is activated when the test signal including an appropriate frequency is present to cause excitation in the telecom service transponder ID device. The resonator and transponder devices preferably have very high impedances at all frequencies except at the desired resonant frequency, and thus avoids violation of telephone service standards. The resonator or transponder ID devices may be placed anywhere along the telephone line, but preferably at the customer premises, or in installed equipment utilizing the telephone line. More than one resonation frequency may be implemented with parallel tuned circuits to indicate additional features of service on the telephone line (e.g., the number of services, the existence of a data service, etc.). The frequencies of resonance of the tuned circuits are preferably chosen to exist between the spectrum utilized by the various operating services. The transponder implementation may generate a simple low frequency response signal, or a more sophisticated specific data pattern using amplitude and/or frequency modulation.

29 Claims, 7 Drawing Sheets

SPECTRAL ALLOCATION OF EXISTING SERVICES SHARING THE PHONELINE MEDIA

ONE PAIR OF TELEPHONE WIRES ACTS AS 3 SEPARATE "CHANNELS" FOR SIMULTANEOUS VOICE, INTERNET ACCESS, AND HOME NETWORKING

FIG. 7
PRIOR ART

TELECOM SERVICE IDENTIFICATION RESONATOR APPARATUS AND TECHNIQUE

This application claims priority from U.S. Provisional Application No. 60/177,685, filed Jan. 24, 2000, entitled "Client Telecom Service Identification" by Jonathan Herman Fischer, Donald Raymond Laturell, and Lane A. Smith, the entirety of which is expressly incorporated herein by reference.

BACKGROUND OF THE INVENTION

1. Field of the Invention

This invention relates generally to telephone devices. More particularly, it relates to apparatus and techniques to identify services utilizing a telephone line, allowing a field technician the ability to interrogate a telephone line to determine any/all services which may be present.

2. Background of Related Art

There has been an explosive growth in the use of telephone lines in many households, driven largely by the need for simultaneous Internet access, voice communications, networking, etc. Many households and small business are already wired with a telephone line, providing the basis for a convenient wired network.

Currently, as many as five (or more) services may co-exist on a single copper pair (i.e., telephone line). They are voice band service (POTS), ISDN service, ADSL service, HPNA (Home Phone line Network Alliance) service and VDSL service. HPNA exists within a home on an internal copper pair, the other services are delivered to the home on an external copper pair.

Figure 6:
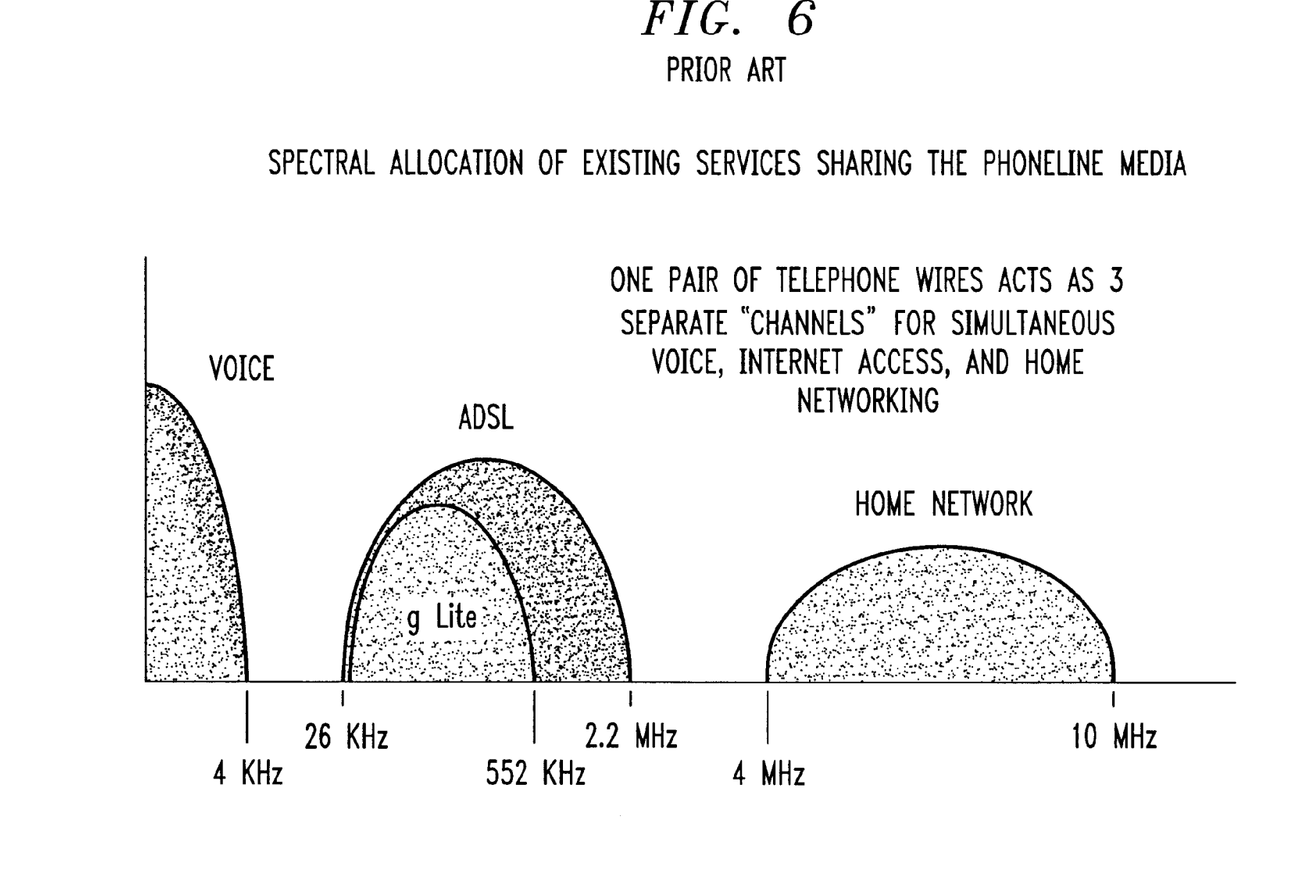
FIG. 6 shows a conventional distribution of spectral regions typically used for various services, e.g., voice services, xDSL services such as ADSL and g.Lite or G.922.2, and of a home network such as HPNA.

FIG. 6. shows a conventional distribution of spectral regions typically used for various services, e.g., voice services, xDSL services such as ADSL and g.Lite or G.922.2, and of a home network such as HPNA. As shown in FIG. 6, a single telephone line is shared such that the various services co-exist as a type of FDM (Frequency Division Multiplex) system. In this arrangement, Plain Old Telephone Service (POTS) exists in the 0–4 kHz region, an exemplary xDSL service may be present from 25 kHz to approximately 2.2 MHz (depending on the definition of "x"), and the HPNA spectrum occupies 5.5–9.5 MHz for HPNA V1.x technology or 4.25–9.75 MHz for the emerging V2.x technology.

Figure 7:
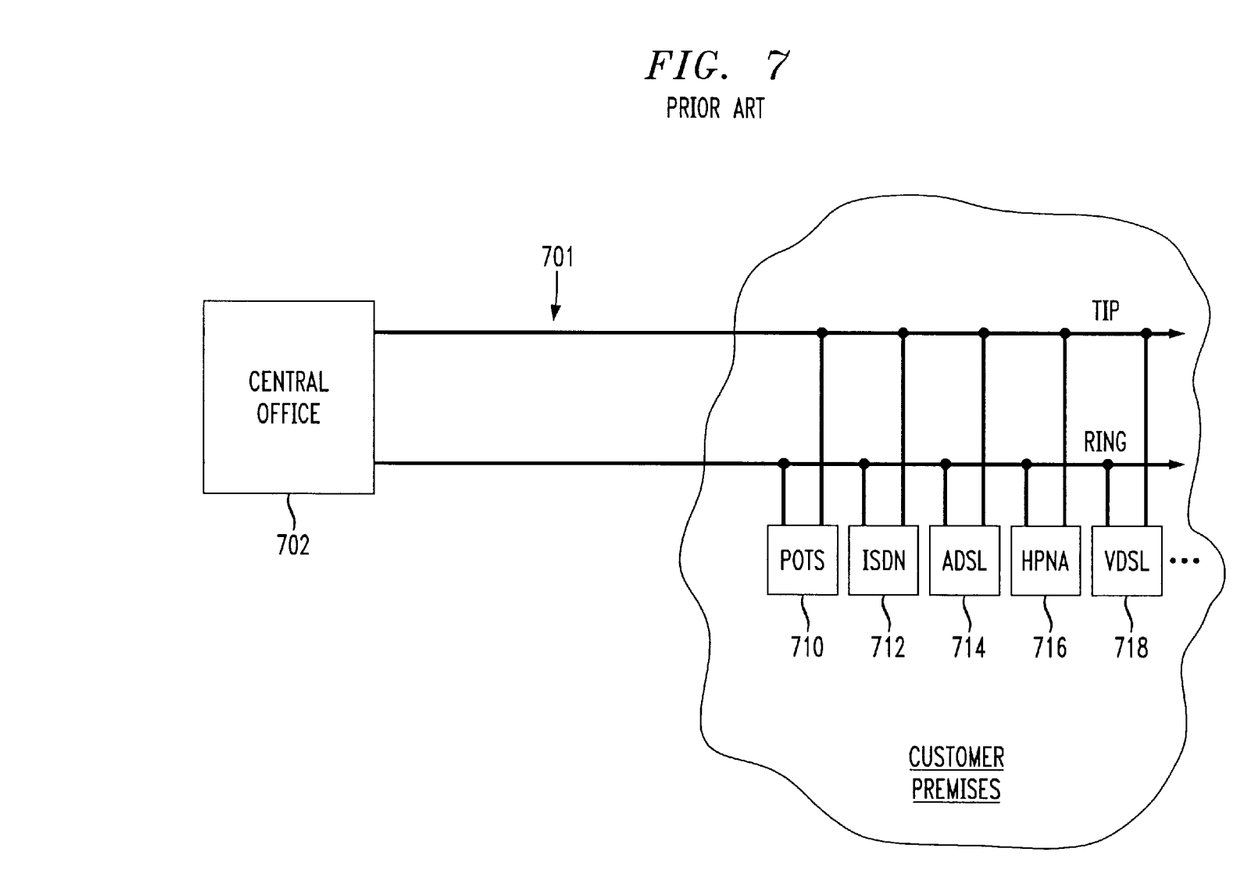
FIG. 7 shows the conventional utilization of various services by various equipment connected to a telephone line at a customer premises.

Correct operation of various wire line services depends on the type of equipment installed in the customer premises. FIG. 7 shows the conventional utilization of various services by various equipment connected to a telephone line 701 at a customer premises. For instance, as shown in FIG. 7, a customer premises may include equipment such as a telephone 710, an ISDN interface 712, an ADSL interface 714, a home network such as HPNA 716, and a VDSL interface 718, all connected to a common telephone line 701 from a central office 702.

Correct operation of this "FDM" system including various services and equipment requires installation procedures that preserve the broad band nature of the copper pair telephone line 701. Moreover, interference with other wire pairs may also present a problem to the telephone technician. Technicians must install the various equipment 710–718 properly to prevent undesirable interference.

The same telephone technicians that initially installed the equipment 710–718 installed in the customer's premises may remember which services are present and/or which equipment was installed, or the particular services and/or equipment may be presented on a work order or other information source. However, over time, the various services may be discontinued and/or some of the equipment 710–718 may be disconnected. Moreover, changes may take place to the telephone line changing the current nature of the telephone line 701 at any moment. Furthermore, as more and more telephone service providers enter the marketplace and competition heats up, detailed information regarding the particular services provided to a customer's premises may not be known or available to a future telephone service technician.

There is a need for a workable identification apparatus and method to allow telephone line technicians the ability to interrogate a telephone line at a customer's premises to determine how many services are present, and/or to determine the identity of the various services present.

SUMMARY OF THE INVENTION

In accordance with the principles of the present invention, a line identification device comprises a first tuned circuit having a particular resonance frequency, and a connection to connect the first tuned circuit across a tip and ring of the line. The first tuned circuit insubstantially changes an impedance of the line at frequencies of normal operation of the line.

A method of providing an identification of existing functions of a telephone line in accordance with another aspect of the present invention comprises placing a first tuned circuit across a tip and ring of the telephone line to represent an aspect of a first type of customer equipment connected to the telephone line. The first tuned circuit insubstantially changes an impedance of the telephone line at frequencies of normal operation of the telephone line.

A method of field determining a presence of a particular service to a telephone line in accordance with yet another aspect of the present invention comprises temporarily applying a test signal to the telephone line. The test signal comprises a signal at a predetermined frequency. A current of the test signal is measured at the predetermined frequency. An increase of the measured current above a current at other frequencies on the telephone line indicates a presence of the particular type of customer equipment.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present application provides techniques and methods for line service identification available to an interrogating telephone technician. In a first set of embodiments, an inexpensive tuned circuit such as a ceramic resonator is placed across a telephone line, either at the central office or at the customer premises. In a second set of embodiments, an inexpensive transponder integrated circuit (IC) is implemented. The transponder is activated when the test signal frequency is present to cause an excitation signal in response.

Resonator Telephone Service ID Devices

Figure 1:
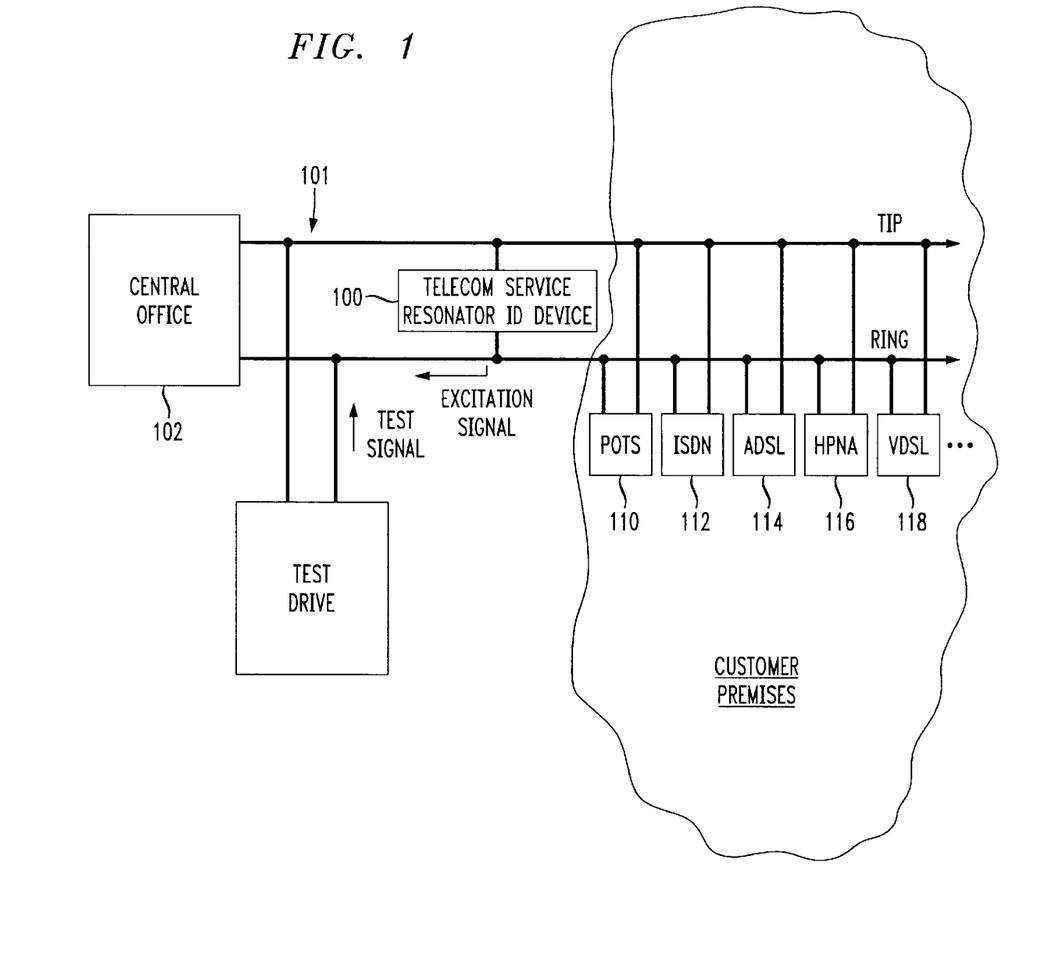
FIG. 1 shows use of a telecom service resonator ID device on a telephone line either at a customer premises or at the central office, in accordance with the principles of the present invention.

FIG. 1 shows use of a telecom service resonator ID device on a telephone line either at a customer premises or at the central office, in accordance with the principles of the present invention.

In particular, as shown in FIG. 1, a telecom service resonator ID device 100 is inserted across a telephone line 101, either at the central office 102 or, preferably, at the customer's premises. At the customer's premises, the telecom service resonator ID device 100 may be installed outside or inside a home or office, and/or external or internal to equipment otherwise utilizing the telephone line 101.

Figure 2:
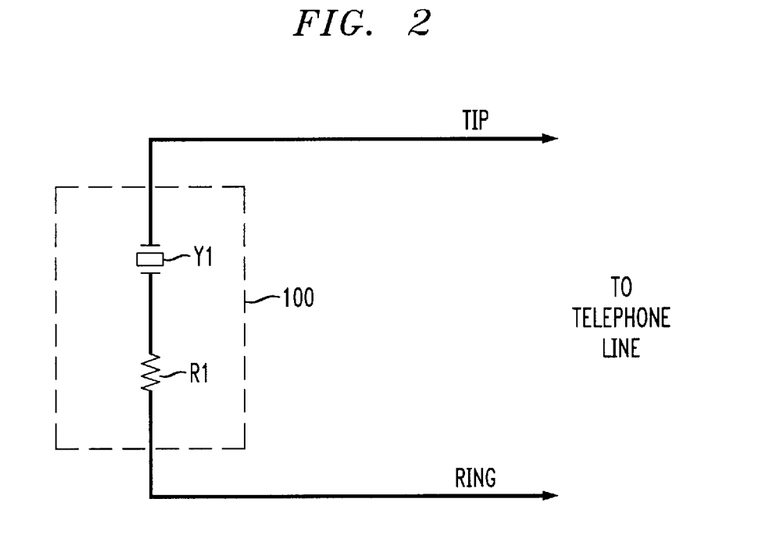
FIG. 2 is a circuit diagram of an exemplary embodiment of a telecom service resonator ID device including one resonator, in accordance with the principles of the present invention.

FIG. 2 is a circuit diagram of a first embodiment of a telephone service ID device, in accordance with the principles of the present invention.

In particular, as shown in FIG. 2, a ceramic resonator Y1 is placed across the tip and ring of the telephone line 101. An impedance, e.g., resistor R1 (or capacitor or other impedance device) may be placed in series with the ceramic resonator Y1.

The ceramic resonator Y1 may be tuned to any particular frequency, but preferably to a frequency which is between the spectrum used by the various telephone services, e.g., between the spectrum ranges utilized by voice, g.Lite, ADSL and home network services shown in FIG. 6. Thus, the frequencies of the tuned circuits of the telecom service resonator ID devices 100 may be preferably chosen to exist between the spectrum utilized by the various operating services. For instance, the frequency of the tuned circuit Y1, R1 of the telecom service resonator ID device 100 may be selected to resonate above voice services at 4 kHz, or between voice services and xDSL services in a range of, e.g., between about 4 kHz and about 26 kHz, between 2.2 MHz and 4 MHz, or above 10 MHz.

Ideally, but not at all necessarily, the selected ceramic resonator Y1 is a commonly used frequency, e.g., a colorburst frequency of 3.58 MHz commonly used in television sets and other devices and thus in abundant (and inexpensive) supply.

The exemplary telecom service resonator ID circuit shown in FIG. 2 has a very high impedance at all frequencies except at the resonant frequency of the resonator Y1. For instance, using a 3.58 MHz resonator Y1 and a relatively low series impedance of, e.g., 100 ohms, the relatively low series impedance at resonance (100 ohms) is significantly lower than at the non-resonant frequencies (>10,000 ohms at low frequencies).

Using a 3.58 MHz resonator Y1, application or injection of a 3.58 MHz test signal into the telephone line 101 will produce a greater amount of test current at that frequency for a telephone line loop 101 that has the resonator Y1 installed across its tip and ring than for a telephone line loop that does not contain the resonator Y1. Thus, the presence of the telecom service resonator ID device 100 on a telephone line 101 can be detected by a telephone line technician by simply injecting a suitable test signal into the telephone line 101.

Of course, there is no requirement that the specific value of 3.58 MHz must be used. In fact, the resonator Y1 may have any particular frequency as long as a detectable change in impedance of the telecom service resonator ID device 100 results from a test signal, and so long as the inactive impedance provided by the telecom service resonator ID device 100 is sufficiently high to satisfy local central office requirements.

In accordance with the principles of the present invention, an increase in current flow through the telephone line loop 101 at a particular well defined identification frequency (or frequencies) signals may be used to detect the presence of one or more telecom service resonator ID devices 100, and thus to indicate types and/or numbers of telecom services present on the telephone line.

In particular, the presence of the resonator Y1 on a particular telephone line 101 can be used to indicate any suitable information regarding telephone service, e.g., the types of service, the number of different services, the existence of a data service in addition to a voice service, etc. Thus, a telephone technician in the field can simply interrogate the telephone line 101 with a test current to be sure of the type(s) of services on the telephone line 101, the number of services, etc.

The tuned circuit formed by the resonator Y1 and series impedance R1 of the telecom service resonator ID device 100 may be placed anywhere along the telephone line 101, but preferably at the customer premises. For instance, the telecom service resonator ID device 100 may be placed on an outdoor service box, or inserted into an open telephone jack (e.g., RJ-11) within the customer premises.

Alternatively, the telecom service resonator ID device 100 may be provided within various equipment utilizing the telephone line 101. This requires a substantial amount of standardization to make it practical. Ideally, a number of manufacturers would utilize the same frequency tuned circuits to indicate the same type equipment.

In accordance with the principles of the present invention, the user may select from a plurality of frequency possibilities if multiple equipment and/or services are present on a particular telephone line, thusly allowing an indication of a number of different devices and/or services. Alternatively, the magnitude of an injected test current at an appropriate frequency may be determined to estimate the number of telecom service resonator ID devices 100 of a particular frequency present on a particular telephone line 101 (assuming the value of the impedance of the resonance is standardized).

Figure 3:
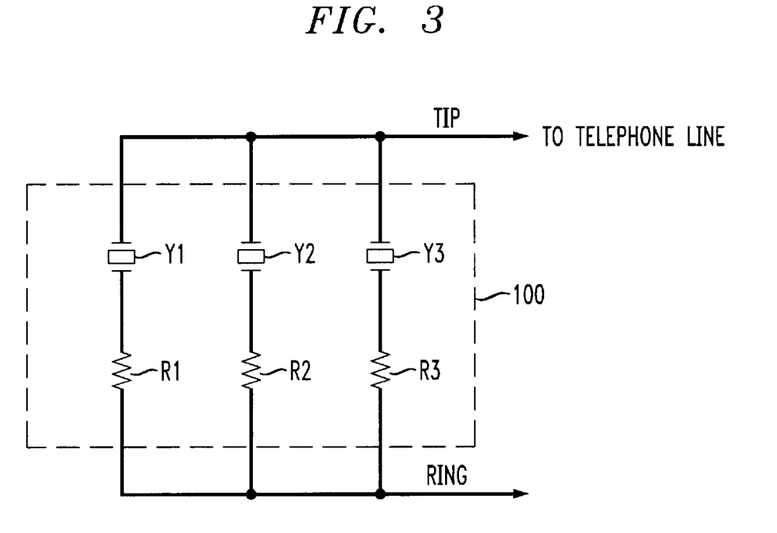
FIG. 3 is a circuit diagram of another exemplary embodiment of a telecom service resonator ID device including a plurality of resonators in parallel, in accordance with the principles of the present invention.

FIG. 3 is a circuit diagram of another exemplary embodiment of a telecom service resonator ID device including a plurality of resonators in parallel, in accordance with the principles of the present invention.

In particular, as shown in FIG. 3, a plurality of resonators Y1, Y2, Y3 and respectively associated impedances R1, R2, R3 of different resonant frequencies may be placed in parallel with each other within a single telecom service resonator ID device 100.

In an ideal situation, the telecom service resonator ID device 100 will appear as a short at resonance. However, in the real world, the telecom service resonator ID device 100 will appear as a dip in impedance. To detect a number of telecom service resonator ID devices 100 on the same telephone line, the amount of the 'dip' in the impedance will preferably be standardized to within a tight range such that inferences can be drawn as to the particular number of telecom service resonator ID devices 100 which are on the telephone line. Thus, a test signal can determine the number of telecom service resonator ID devices 100 based on the amount of 'dip' in the impedance at a particular resonant frequency.

The particular combination of frequencies within the single telecom service resonator ID device 100 may be used to indicate, e.g., the number of services present, the types of services present, the existence or types of data services present, and/or the number and types of services present.

Although FIG. 3 shows the implementation of three parallel resonator circuits Y1 & R1, Y2 & R2, and Y3 & R3, any number of resonator circuits or other tuned circuits may be connected in parallel to indicate various aspects of a particular telephone line, within the principles of the present invention.

Moreover, any number of single or multiple resonator circuit modules may be connected in parallel, in accordance with the principles of the present invention. For instance, each piece of customer premises equipment may include one or more resonator circuits identifying that particular equipment, and each of these pieces of customer premises equipment may be connected in parallel together on a common telephone line. In this way, the central office can test to determine the particular customer premises equipment connected to a particular customer's telephone line at any one time.

Transponder Telephone Service ID Devices

Figure 4:
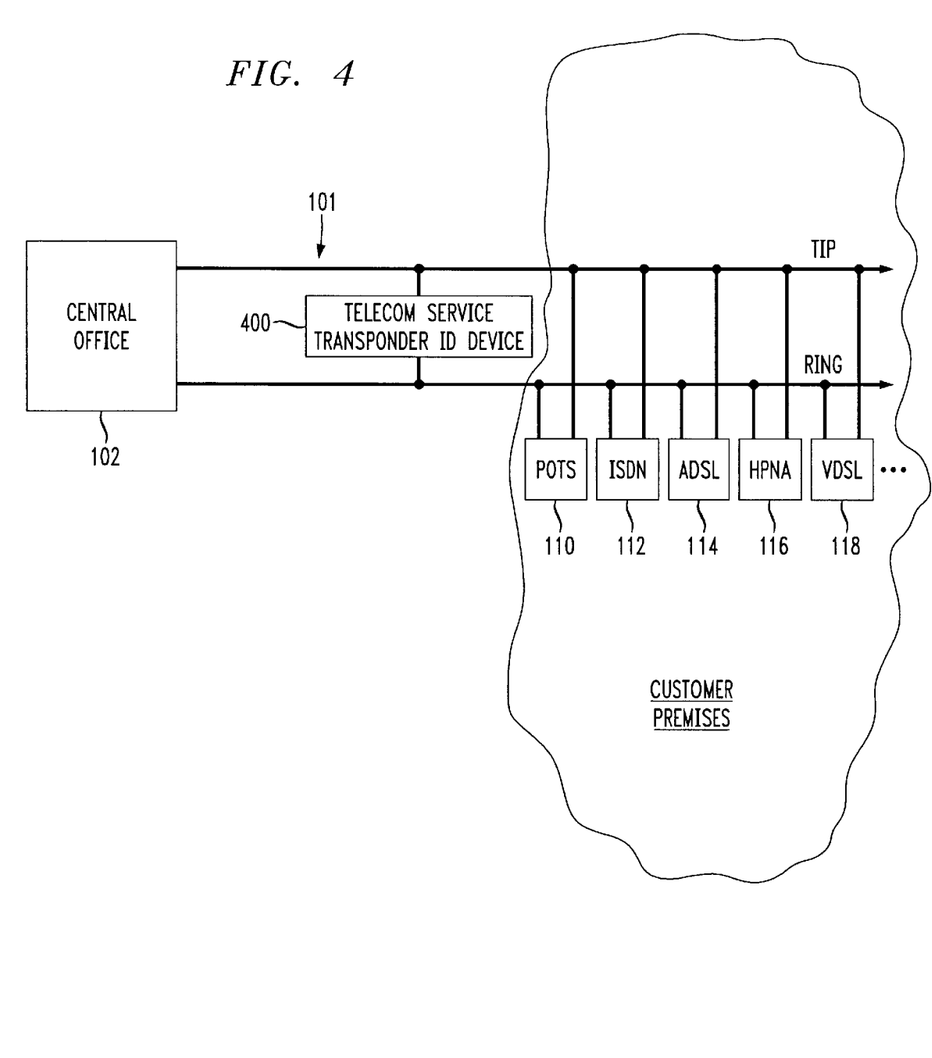
FIG. 4 shows use of a telecom service transponder ID device on a telephone line either at a customer premises or at the central office, in accordance with the principles of the present invention.

FIG. 4 shows use of a telecom service transponder ID device on a telephone line either at a customer premises or at the central office, in accordance with the principles of the present invention.

In particular, as shown in FIG. 4, a telecom service transponder ID device 400 is inserted across a telephone line 101, either at the central office 102 or, preferably, at the customer's premises. At the customer's premises, the telecom service transponder ID device 400 may be installed outside or inside a home or office, and/or external or internal to equipment otherwise utilizing the telephone line 101.

The telecom service resonator ID device 100 may be extremely small, and can be implemented within, e.g., a crimp-on device. The packaging of the telecom service resonator ID device 100 may include a number and/or color coding to identify visually (as well as electrically) the type of service provided to a particular telephone line.

The test device used to detect and identify the telecom service resonator ID device 100 may include, e.g., an oscillator tuned to the particular resonant frequency of the telecom service resonator ID device 100 being looked for. The test device may sweep across a particular band of frequencies looking for dips in impedance at particular frequencies tagged to particular HPNA services. The test device might indicate the presence of one or more telecom service resonator ID devices 100 by, e.g., lighting an LED, indicating a particular number code, displaying the name of the particular home network, etc.

In response to an appropriate frequency test signal as described with respect to FIGS. 1–3, the response signal back from the telecom service transponder ID device 400 may be simple or more sophisticated.

For instance, in response to an activation signal from a telephone technician, the telecom service transponder ID device 400 may generate a simple low frequency response signal.

Alternatively, in a more sophisticated implementation, the telecom service transponder ID device 400 may be programmed to emit a response signal in the form of a specific data pattern that is unique to a given telephone line loop 101. The specific data pattern can be used to represent any desired information regarding the use of the telephone line 101, e.g., the types of services, the existence and type of data service, the use of the telephone line 101 for one or more home networks, etc.

The data pattern may be used to modulate the response excitation signal. For instance, the excitation signal may be modulated in a specific pattern that only the particular telecom service transponder ID device 400 is 'tuned' to accept.

Figure 5A:
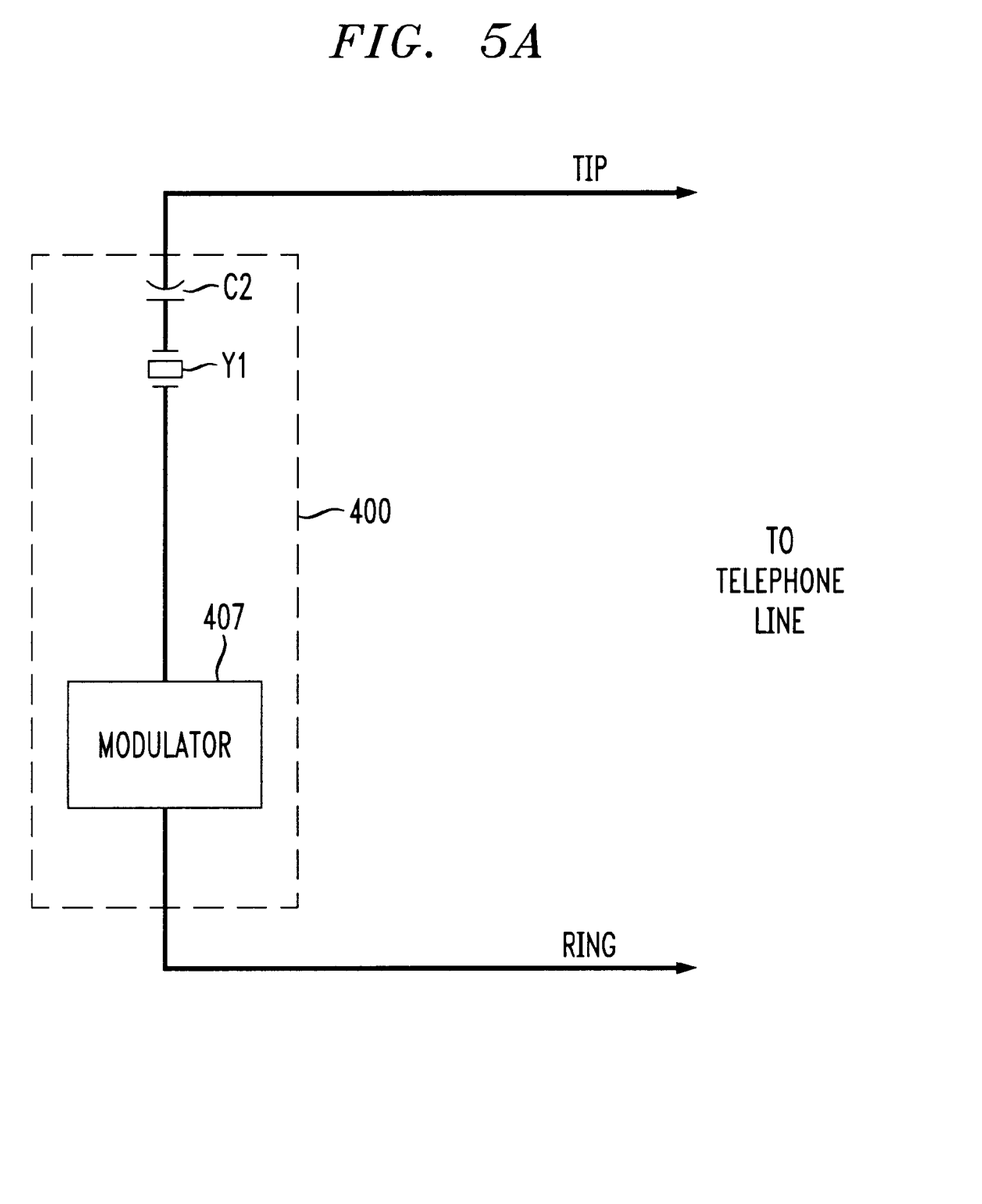
FIGS. 5A and 5B show a circuit diagram of an exemplary embodiment of a telecom service transponder ID device, in accordance with the principles of the present invention.
Figure 5B:
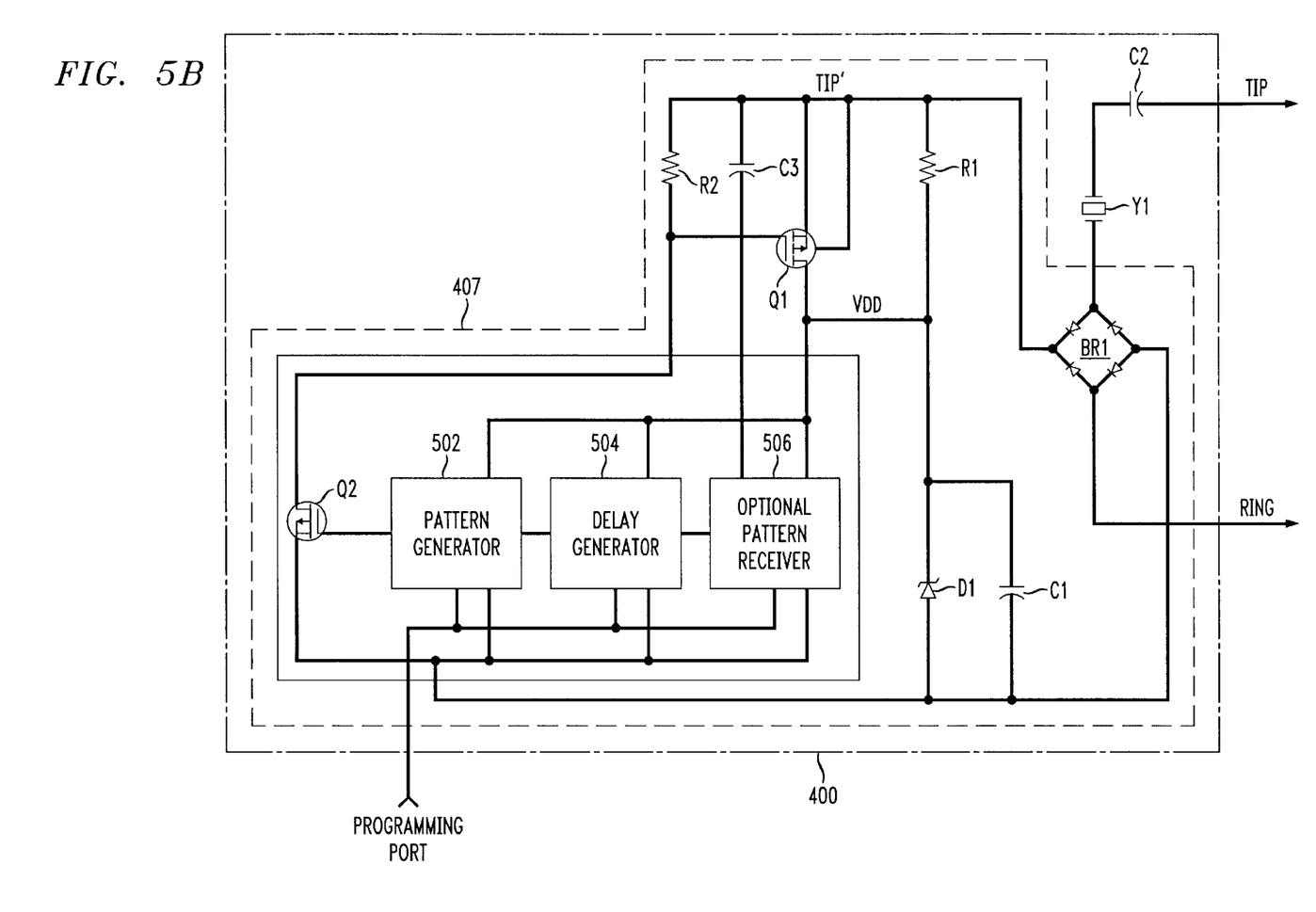

FIGS. 5A and 5B show an exemplary embodiment of a telecom service transponder ID device 400, in accordance with the principles of the present invention.

In particular, FIG. 5A shows a telecom service transponder ID device 400 including an impedance device (e.g., capacitor C2) in series with a resonator Y1 (e.g., 3.58 MHz ceramic resonator). In accordance with this embodiment, an excitation signal through the resonator Y1 is modulated by an appropriate modulator 407.

FIG. 5B shows an exemplary modulator 407 shown in FIG. 5A in more detail.

In particular, as shown in FIG. 5B, the tuned circuit including the ceramic resonator Y1 (e.g., at 3.58 MHz) is placed in series with a full wave rectifier BR1 across the tip and ring of the telephone line 101. The full wave rectifier BR1 is controlled by appropriate switching circuitry and an appropriate pattern generator 502.

To excite the telecom service transponder ID device 400, a test signal is injected into the telephone line 101 by, e.g., a telephone technician. The test signal includes the same frequency (e.g., 3.58 MHz) as the frequency of resonation of the resonator Y1. Moreover, the test signal of the disclosed embodiment should have an amplitude sufficiently high to cause rectification to occur in the full wave rectifier BR1. In accordance with the principles of the present invention, such a high level would not be present during normal service. In this manner, the telecom service transponder ID device 400 remains inactive until interrogated, but activates and transponds upon detection of an appropriate test signal.

The voltage of the test signal may be constant. In such a case, after a delay that is sufficient to charge capacitor C1 in the modulator 407, a pattern generator 502 activates transistor Q1, turning the transistor Q1 ON and OFF at a specific rate in a specific pattern relating to, e.g., the types of services to the particular telephone line 101, the number of services, etc.

The specific ON-OFF pattern of the transistor Q1 activates transistor Q2, which produces a short circuit across resistor R1 at the pattern rate. The variable short circuit current across resistor R1 caused by the pattern generator 502 effectively amplitude modulates the applied "carrier"

(e.g., a 3.58 MHz "carrier"), which in turn can be detected by appropriate demodulation equipment based on the same "carrier" used by the telephone technician.

The rate of change of the ON-OFF status of transistors Q1 and Q2 may preferably be made sufficiently high to produce side bands that are sufficiently removed from the carrier to allow detection of the "modulation" caused by the pattern generator 502.

Alternatively, the amplitude of the test signal may be held constant until capacitor C1 is charged. Once capacitor C1 is charged, the test signal may be amplitude modulated at a desired rate.

The particular modulation pattern in the pattern generator 502 representing, e.g., the types of service, the numbers of services, the presence of a data service or a home network, etc., may be pre-programmed into an optional pattern receiver 506. The pattern receiver 506 may be any data retaining circuit, e.g., memory, latches, etc. which stores the specific data pattern utilized by the pattern generator 502 in causing modulation of the "carrier" frequency of the tuned circuit.

The pattern receiver 506 allows for multiple telecom service transponder ID devices 400 to be addressed over a common telephone line 101. The pattern receiver 506 may also provide greater protection against false response from a transponder telephone service ID device 400 in accordance with the principles of the present invention.

In either embodiment, the pattern generator 502 and/or the pattern receiver 506 may be programmed for additional flexibility of deployment in the field.

A delay generator 504 may be implemented to separate transmissions from the pattern generator 502.

A telephone service ID device 400 in accordance with the principles of the present invention has the ability to avoid alteration of the impedance of a telephone line, and thus no known national or international telephone service standards would be violated. Moreover, no non-linear loading of the telephone line loop would occur, preventing distortion from being produced.

The telecom service ID devices 100, 400 may be implemented anywhere on a telephone line. For instance, the telecom service ID devices 100, 400 may be implemented at the junction box outside a customer's premises. Alternatively, the telecom service ID devices 100, 400 may be implemented in an equipment rack at the central office but in communication with the relevant telephone line.

The telecom service ID devices 100, 400 may instead be implemented in customer premises equipment installed in the customer's premises. For instance, a DSL device 114, 118 within the customer premises may include an appropriate telecom service resonator ID device 100 as shown in FIGS. 1–3, or an appropriate telecom service transponder ID device 400 as shown in FIGS. 4 and 5. In this way, a test signal would identify only that equipment which is currently connected to the relevant telephone line.

The telecom service ID devices 100, 400 in accordance with the principles of the present invention have applications for use by multiple service wire line customers throughout the world.

While the invention has been described with reference to the exemplary embodiments thereof, those skilled in the art will be able to make various modifications to the described embodiments of the invention without departing from the true spirit and scope of the invention.

What is claimed is:

1. A line identification device, comprising:
    a first tuned circuit having a particular resonance frequency selected to represent an aspect of a first type of customer equipment connected to a line; and
    a connection to connect said first tuned circuit across a tip and ring of said line;
    wherein said first tuned circuit insubstantially changes an impedance of said line at frequencies of normal operation of said line.

2. The line identification device according to claim 1, wherein said first tuned circuit comprises:
    a resonator.

3. The line identification device according to claim 2, wherein:
    said resonator is a ceramic resonator.

4. The line identification device according to claim 2, wherein said first tuned circuit further comprises:
    a resistor in series with said resonator.

5. The line identification device according to claim 1, further comprising:
    a plurality of additional tuned circuits each in parallel to said first tuned circuit.

6. The line identification device according to claim 5, wherein:
    each of said plurality of additional tuned circuits has a resonance frequency different from the remaining ones of said plurality of additional tuned circuits.

7. The line identification device according to claim 5, wherein:
    each of said plurality of additional tuned circuits represents information regarding a type of customer equipment connected to said line.

8. The line identification device according to claim 7, wherein said type of customer equipment includes at least one of the following:
    home networking equipment;
    voice service equipment;
    ISDN equipment; and
    xDSL equipment.

9. The line identification device according to claim 8, wherein said xDSL equipment is one of:
    ADSL equipment; and
    VDSL equipment.

10. The line identification device according to claim 1, wherein:
    a presence of said first tuned circuit across said line represents implementation on said line of a particular data equipment in addition to voice equipment.

11. The line identification device according to claim 5, wherein:
    at least one of said plurality of additional tuned circuits and said first tuned circuit represent information regarding an existing home network utilizing said line.

12. The line identification device according to claim 1, wherein:
    said line identification device is adapted for connection to a telephone line.

13. The line identification device according to claim 1, wherein:
    said line identification device is formed on an integrated circuit.

14. The line identification device according to claim 1, wherein:

a frequency of resonance of said first tuned circuit is selected to be outside of a spectrum of customer equipment utilizing said line.

15. The line identification device according to claim 14, wherein:
said frequency of resonance of said first tuned circuit is between about 4 kHz and about 26 kHz.

16. The line identification device according to claim 14, wherein:
said frequency of resonance of said first tuned circuit is between about 2.2 MHz and about 4 MHz.

17. The line identification device according to claim 14, wherein:
said frequency of resonance of said first tuned circuit is above 10 MHz.

18. The line identification device according to claim 14, wherein:
said frequency of resonance of said first tuned circuit is above 4 kHz.

19. A method of providing an identification of existing functions of a telephone line, comprising:
placing a first tuned circuit across a tip and ring of said telephone line selected to represent an aspect of a first type of customer equipment connected to said telephone line, said first tuned circuit insubstantially changing an impedance of said telephone line at frequencies of: normal operation of said telephone line.

20. The method of providing an identification of existing functions of a telephone line according to claim 19, wherein said first tuned circuit comprises:
a resonator.

21. The method of providing an identification of existing functions of a telephone line according to claim 19, wherein:
said aspect of said first type of customer equipment is a number of services utilized on said telephone line.

22. The method of providing an identification of existing functions of a telephone line according to claim 19, further comprising:
placing an additional plurality of tuned circuits across said telephone line to indicate aspects of respective additional types of customer equipment connected to said telephone line;
wherein each of said additional plurality of tuned circuits and said first tuned circuit have a different frequency of resonance from the remaining ones of said additional plurality of tuned circuits and said first tuned circuit.

23. The method of providing an identification of existing functions of a telephone line according to claim 19, further comprising:
placing a second tuned circuit having a substantially same frequency of resonance as said first tuned circuit across said telephone line to indicate additional aspects of said first type of customer equipment connected to said telephone line;
whereby said second tuned circuit increases an amplitude of a test current at said frequency of resonance applied to said telephone line.

24. A method of field determining a presence of a particular service to a telephone line, comprising:
temporarily applying a test signal to said telephone line, a level of said test signal comprising a signal at a predetermined frequency; and
measuring a current of said test signal at said predetermined frequency;
wherein an increase of said measured current above a current at other frequencies on said telephone line indicates a presence of said particular type of customer equipment.

25. Apparatus for providing an identify of existing functions of a telephone line, comprising:
first tuned circuit means across a tip and ring of said telephone line selected to represent an aspect of a first type of customer equipment connected to said telephone line, said first tuned circuit insubstantially changing an impedance of said telephone line at frequencies of normal operation of said telephone line.

26. The apparatus for providing an identify of existing functions of a telephone line according to claim 25, wherein said first tuned circuit means comprises:
a resonator.

27. The apparatus for providing an identify of existing functions of a telephone line according to claim 25, wherein:
said aspect of said first type of customer equipment is a number of customer equipment connected to said telephone line.

28. The apparatus for providing an identify of existing functions of a telephone line according to claim 25, further comprising:
additional plurality of tuned circuit means placed across said telephone line for indicating at least one aspect of at least one additional type of customer equipment connected to said telephone line;
wherein said additional plurality of tuned circuit means has a different frequency of resonance from said first tuned circuit means.

29. Apparatus for field determining a presence of a particular service to a telephone line, comprising:
means for temporarily applying a test signal to said telephone line, a level of said test signal comprising a signal at a predetermined frequency; and
means for measuring a current of said test signal at said predetermined frequency;
whereby an increase of said measured current above a current at other frequencies on said telephone line indicates a presence of said particular type of customer equipment.

* * * * *